R. ASHWORTH.
MACHINE FOR MAKING METALLIC BRUSHES OR CARDS.
No. 184,494. Patented Nov. 21, 1876.
Fig. 1. Vertical Section.
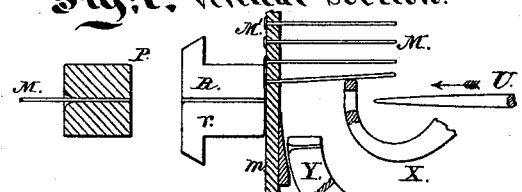
Fig. 2. Ver. Sec.
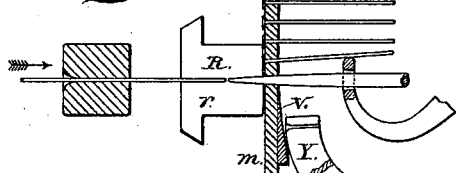
Fig. 3. Ver. Sec.
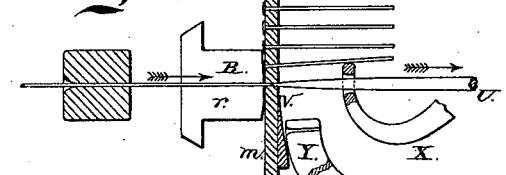
Fig. 4. Ver. Sec.
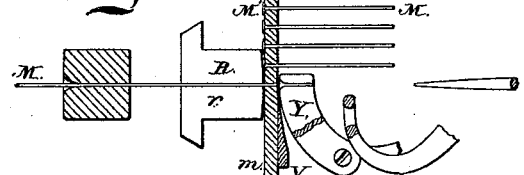
Fig. 5. Plan.
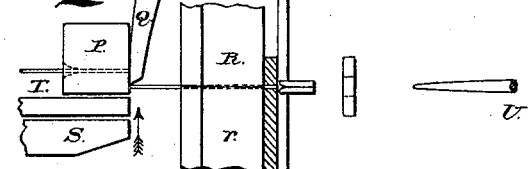
Fig. 6. Plan.
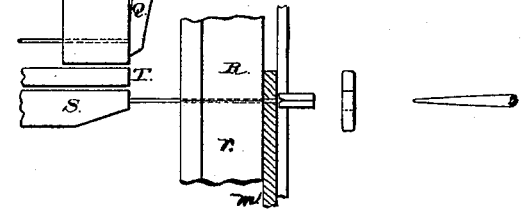
Fig. 7. Ver. Sec.
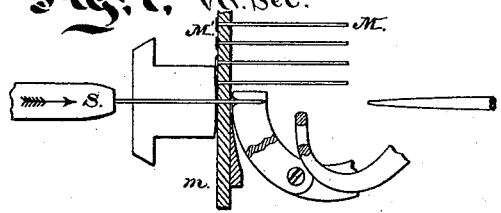
Fig. 8. Ver. Sec.
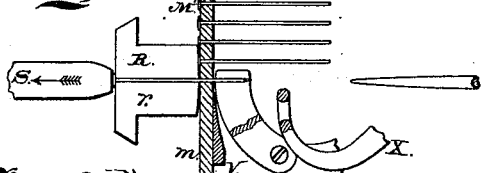
Fig. 9. Plan.
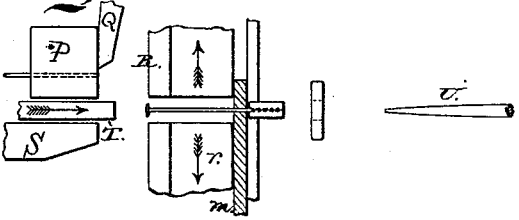
Fig. 10. Ver. Sec.
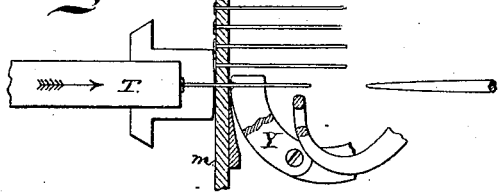
Fig. 11. Ver. Sec.
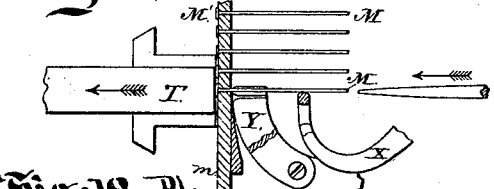
Fig. 12. Plan.
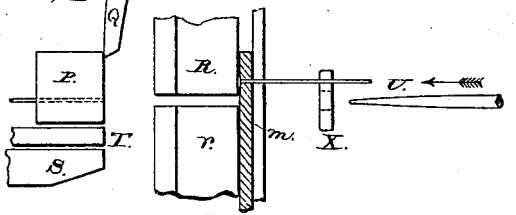
Witnesses:
Inventor:
Robert Ashworth

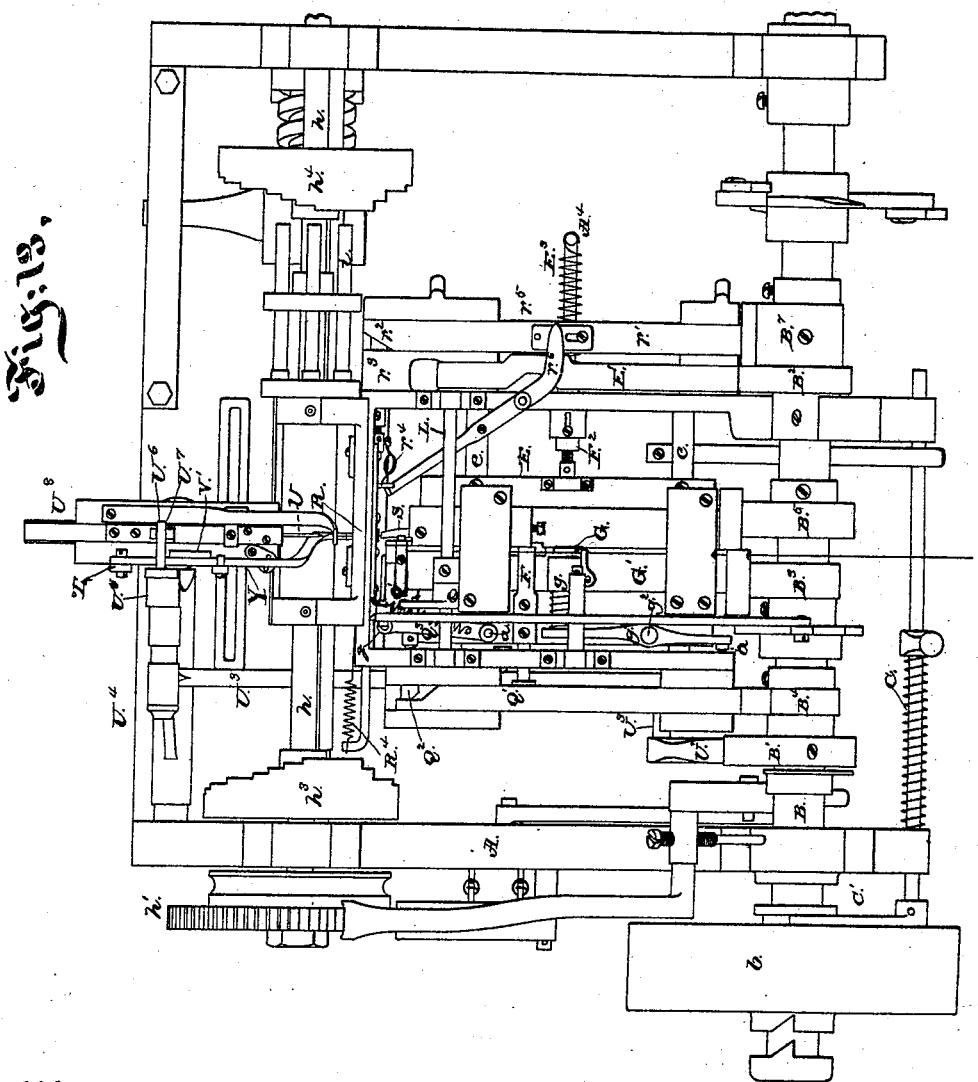

3 Sheets—Sheet 3.
R. ASHWORTH.
MACHINE FOR MAKING METALLIC BRUSHES OR CARDS.
No. 184,494. Patented Nov. 21, 1876.
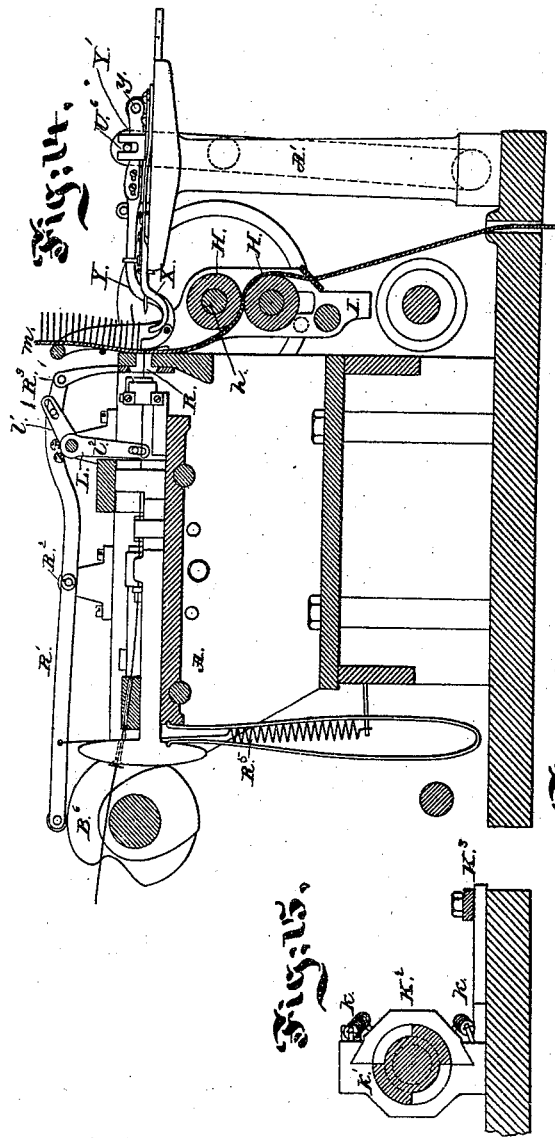
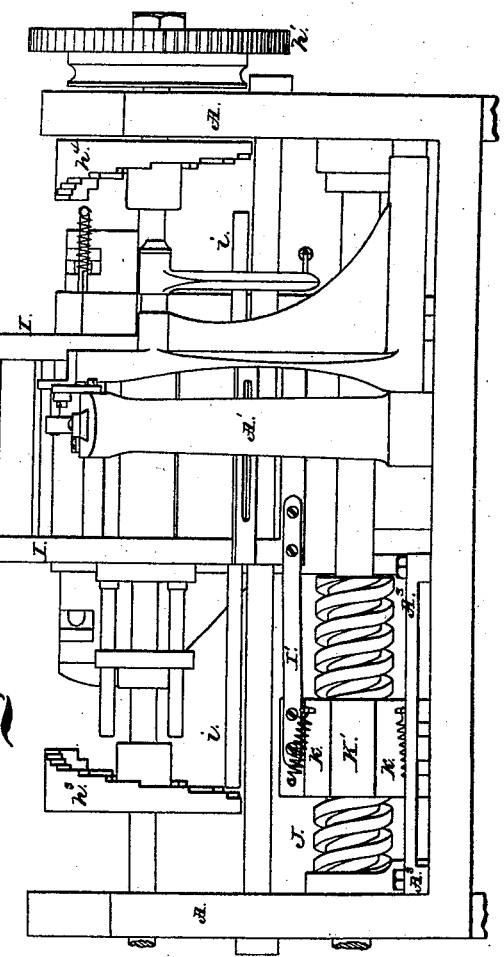

UNITED STATES PATENT OFFICE.

ROBERT ASHWORTH, OF FALL RIVER, ASSIGNOR TO JAMES P. POLAND, OF ARLINGTON, MASSACHUSETTS.

IMPROVEMENT IN MACHINES FOR MAKING METALLIC BRUSHES OR CARDS.

Specification forming part of Letters Patent No. 184,494, dated November 21, 1876; application filed June 19, 1876.

*To all whom it may concern:*

Be it known that I, ROBERT ASHWORTH, of Fall River, Bristol county, Massachusetts, have invented certain Improvements in Machines for Manufacturing Brushes, of which the following is a specification:

My improved machine cuts off proper lengths of wires, inserts them in sheet-rubber or other supporting material, forms a head thereon analogous to the head of a pin, and leaves it with the head closely set against the face, which is to form the back face when the brush is in use. It sets the wire teeth uniformly in spaces of varying widths, so as to produce hair-brushes and the like in the oval, tapering, or pointed forms required. I have experimented practically and successfully with the machine.

The machine is analogous to those used in setting the wire teeth of card-clothing, with which those for whom this specification is written are supposed to be familiar.

The following is a description of what I consider the best means of carrying out the invention.

The accompanying drawings form a part of this specification.

Figures 1 to 12, inclusive, represent the short lengths of wire, and the parts immediately adjacent thereto, in several successive stages of the operation. Figs. 1, 2, 3, 4, 7, 8, 10, 11 are vertical sections, and Fig. 5, 6, 9, and 12 are plan views. The motions of the parts are indicated by arrows. The succeeding figures represent larger portions or the whole of the machine on a smaller scale.

Fig. 13 is a plan view. Figs. 14 and 15 are vertical sections; and Fig. 16 is a rear elevation. These figures show the novel parts with so much of the ordinary parts as is necessary to indicate their relation thereto.

Similar letters of reference indicate like parts in all the figures.

I will describe the work which is done before pointing out the means for obtaining the motions.

In Figs. 1 to 12, *m* is a backing or ground of vulcanized india-rubber; M, the lengths of wire which are set, or to be set therein. M' is the head, which is formed on each during the process. P is a hardened steel piece. Through a hole in this piece the wire passes. Q is a narrow chisel-shaped piece, which serves as a knife or shear in conjunction with the perforated piece P to cut off the wire. The wire is cut by a movement of the piece P sidewise, while the chisel-shaped piece Q remains stationary for the time being. R *r* represent grooved dies, a pair of which are peculiarly operated to hold the wire, at first gently, and afterward tightly. S is the header, which slides the wire along, while it is very gently held in the dies, and which, after the dies have closed tightly, so as to give a firm gripe on the wire, crushes the end to form a head. T is a pusher, which thrusts the wire farther through the rubber *m* after the header has fulfilled its function, and the dies have widely opened. U is an awl which punctures the rubber *m*, and which as it retreats is closely followed by the point of the advancing wire. X is a member of the mechanism, which I designate a deflector, which performs several important functions—one to hold away the wires previously set during the entrance of the awl, and another to support the wire after it is set during the removal of the spring-nippers Y. I designate these nippers Y the "steadier." Their function is to support the wire near its point at certain stages of the operation. V is a fixed bar, thin at its upper edge, which aids to support the rubber *m*, and prevent its being displaced by the withdrawal of the awl or the force of the pusher. The dies form a support for the other face of the rubber *m*, and prevent its being displaced in the opposite direction during the thrust of the awl.

In Fig. 1 the deflector is in position to hold away the wires previously set, and the awl has just commenced to move toward the rubber to produce a hole. The wire has not yet commenced to feed forward.

In Fig. 2 the awl has perforated the rubber, and the wire has commenced to feed forward.

In Fig. 3 the awl is in full retreat, and the wire is closely following it, almost touching its point, the dies having closed upon it with a slight spring-force, so as to guide it.

In Fig. 4 the awl has fully retreated, and the point of the wire has passed through the rubber. The steadier has moved into place.

In Fig. 5 the length of wire has been cut off by a lateral movement of the perforated piece P, while the chisel-piece Q remained rigidly stationary, thus cutting off the length of wire without bending it or disturbing its position. At this stage the chisel Q commences to also move away, and, as the lateral motion of the perforated piece P still continues, it follows that the two move together.

In Fig. 6 the header has come opposite the short length of wire just cut.

In Fig. 7 this header has commenced to push the now independent length of wire endwise through the gently-closed dies R, and into the steadier Y. After the header has pushed the wire a certain distance, its motion is arrested for a brief interval, during which period the dies R r close powerfully together, so that a further motion of the header will crush the small portion of wire still projecting, and form a head, M'.

Fig. 8 shows the position of the parts at the moment the head is thus formed.

In Fig. 9 the header has retreated, and also moved laterally, to bring the pusher opposite the headed wire, and the dies have widely opened, the headed wire being held firmly in position by the steadier. At this period the steadier is particularly important, because the wire is no longer steadied or supported by the dies.

In Fig. 10 the pusher is forcing the wire farther through the rubber m and steadier Y.

In Fig. 11 the headed wire M has been forced entirely home. The steadier Y has performed its full duty, and is about to be moved downward out of the way again. As a preparatory step for this, the deflector X has risen, and stands immediately below the newly-set wire M M'. It is in position to support the wire during the removal of the steadier. The pusher is commencing to retreat.

In Fig. 12 the steadier has been moved downward out of the way, the pusher has retreated, and the perforated piece P, with the wire, moved again into position for a new thrust. The back m has been moved laterally to present the proper place for the next wire. The awl is advancing rapidly to make the next hole, and the dies have come into position, ready to support the rubber m during the act of puncturing by the awl, and ready also to receive the fresh length of wire immediately after. The whole round of operations may now be repeated.

Figure 1 is an elevation at the same stage of operation as the plan view in Fig. 12. At this stage the deflector X is performing an important function by having risen to such a height as to deflect away the contiguous wires and clear the track for the awl. The round of operations is thus repeated, the whole round occupying, as I have usually worked, about half a second.

Figs. 13, 14, 15, and 16 show the means of obtaining the several motions so clearly that only a brief description will be necessary. A is a rigid framing, supported on suitable legs, and which supports the several working-parts. The power is received on a pulley, $b$, by means of a belt operated by a steam-engine or other convenient power. (Not represented.) The pulley $b$ is mounted on a shaft, B, and is engaged and disengaged by being moved endwise, controlled by an arm, C', carried on a slide-bar, C. The entire mechanism is driven by the shaft B through the agency of cams fixed thereon.

Some of the parts are operated directly, others through a circuitous train of connections, and some of the principal parts are mounted on a laterally-moving carriage, and are subjected to two motions, one derived directly from the proper cam on the main shaft B, and another from the carriage on which it is mounted.

A cam, $B^1$, reciprocates the awl U through the following train of connections: the lever $U^1$, pivot or bell crank $U^2$ beneath $U^1$, bent rod $U^3$, pin $U^4$, lever $U^5$, pin $U^6$, fork $U^7$, and long slide $U^8$. The awl is fixed in the latter, with provisions for adjustment and removal. The slide $U^8$ is supported in ways formed in the stout post $A^1$ of the framing. This train of mechanism gives motion also to the deflector X. The shape of this deflector is made long and flat, so as to allow the required vertical motion by its elasticity, and its rear end is secured firmly upon the post $A^1$ of the framing. A cam-like projection is secured on the top of the awl-slide $U^8$, and gives motion to the deflector. The steadier Y, sometimes called the spring-nippers, is pivoted to the framing at $y$. It is pressed upward by a spring. (Not clearly represented.) It is depressed by the pin $U^6$, which acts on the upper surface of a cam-like piece, $Y^1$, attached adjustably to Y by means of pinching-screws. The back $m$, of rubber or other material, requires to be moved laterally a step after each tooth is set, and to be lifted after each row is completed. The rows require to vary in length in order to give the proper outline to the brush. These varying lengths of the rows are controlled by two stepped face-cams, $h^3$ $h^4$, fixed on the shaft $h$. The vertical motion is imparted by a pulley above, (not represented,) controlled by a pair of rollers, H H, one of which is loosely mounted on the shaft $h$, on which is fixed a ratchet-wheel, $h^1$, which is operated by mechanism (only partially represented,) which corresponds with the analogous parts of the well-known card clothing machines. One or both of the rollers H is roughened or provided with fine points, which take a firm hold of the rubber $m$. The controlling-frame I has a lateral step-by-step motion, which is increased or diminished in range, according to the positions of the cams $h^3$ $h^4$. These latter are stepped to receive the arms $i$ $i$, which extend out from the frame I. The frame I is moved by an intermittent or step-by-step motion of the screw J, received from the main shaft B through mechanism not fully represented. The frame I receives the action of the screw J through a connection, I¹, to a peculiar nut formed in halves K¹ K², the latter of which is capable of sliding endwise relatively to the other, being dovetailed therein, as shown in Fig. 15. The parts are connected together by gentle spiral springs $k$, which exert a constant tension on the parts, and take up any slack which may arise from wear either of the nut or the screw-threads. The nut is formed with a tail, K³, which traverses under a straight bridge or bar, A³. The provisions, (not fully represented,) for reversing the step-by-step motion of the screw J, and thus reversing the traverse of the rubber $m$, are similar to those in the ordinary card clothing machine before referred to, except that, instead of feeding always to the same extent laterally right and left, it feeds to a varied extent, according to the distance to which the arms $i$ are allowed to move before striking against the corresponding cam $h^3$ or $h^4$. Other principal parts are carried on a stout carriage, which is moved forcibly to one side at each revolution of the driving-shaft. The carriage is marked E, and is guided by stout rods $e$. A cam, B², communicates the motion to the carriage E through the medium of a slide, E¹, which acts wedgewise on a slide, E², supported in the framing, and made adjustable by a screw-connection. The slide E¹ is kept in contact with the cam B² by a spring underneath. (Not represented.) The carriage E is drawn constantly to the right by the force of the spring E³, which connects it to an arm, A⁴, on the framing. The carriage E is moved to the right by the spring E³, and is at the proper time moved to the left by a positive motion received from the cam B² through the slide E¹. Among the parts carried on the carriage E the first to be described is the feeder.

The cam B³ reciprocates a pair of nippers, which feed forward the wire intermittently. The cam acts directly against the feeder-slide G¹, which carries a pair of nippers, G. These nippers are closed by the action of the spring $g$, and are opened at the proper time through the action of a lever, $g^1$, which turns on a pivot, $g^2$, carried on the framing or carriage E. This lever is worked by the side motion of the frame E. Such motion brings the front end of the lever $g^1$, at the proper time, in contact with a stop, $a$, which has a screw, and may be adjusted by screwing it in or out of the framing A, as required.

The feeding-nippers G open to permit the nippers to move toward the front of the machine—by which I mean toward the shaft B; and I will term this the "backward motion" of the nippers, as it is backward to the motion of the wire. They close and seize the wire, and remain closed during their motion in the opposite direction. They are adjusted to feed forward the proper length to be headed and inserted.

To avoid drawing backward the wire after each feeding-movement, another pair of nippers, which I term "holding-nippers," is provided, marked F. These require to be closed while the feeding-nippers are opened on the backward motion, and to be opened while the feeding-nippers are feeding forward, to afford a fresh length of wire. This is effected also by the lateral motion of the carriage E, which brings the head of the connected collar $f^1$ out of contact with the frame A, and allows the nippers F to close by the force of the spring $f^2$.

Figs. 1 to 4 represent the effect of the feeding forward of the wire. Figs. 5 and 6 represent the cutting-off motion. This is due in part to the side motion of the carriage E, which moves the perforated piece P, fixed firmly on the same, but it is necessary that the chisel Q, against which the cutting is effected, shall also have a motion. It is stationary while the cutting is effected, but must afterward move out of the way to make room (as in Fig. 6) for the operation of the header and pusher.

B⁴ is a cam, which controls the operation of the chisel Q through the medium of the slide Q¹, having an oblique or wedge-like surface near its back end, a transverse sliding piece, Q², adapted to be acted on by said wedging-surface, and a lever, Q³, turning on a pivot, $q$, carried on the carriage E. The lever Q³ is pivoted to the chisel Q.

A spring over the lever Q³, and attached thereto, holds the chisel Q in contact with the piece P. The slide Q² carries a screw, the head of which forms the abutting-point for the lever Q³. By turning this screw in or out the action may be adjusted so as to effect the cutting at exactly the right point.

The dies R $r$, which guide the wire, and hold it during the heading operation, are both movable, being supported in a dovetailed groove in the framing A. When the point of the awl is received through the rubber $m$, it enters a little distance between the dies R $r$, which separate or open a little to allow this movement. On the retreat of the awl the wire M follows, its end being almost or quite in contact with the point of the awl, so that the hole in the rubber shall not close up before it. The dies guide the wire during this movement. They are at this period held together with the gentle force of a spring.

In all the movements of the dies, the left-hand die R is subject to the constant force of a spring, R⁴, which tends to pull it away from its mate $r$. The motion of R in the opposite direction toward the wire M, is induced by a wedge.

B⁶ is a cam, which, through a roller, operates a lever, R¹, which turns on a pivot, R², fixed on the framing A. The other end of the lever R¹ is pivoted to a wedge, R³, which is mounted point downward, so as, by being depressed, to move the die R in opposition to the constant force of the spring $R^4$. The wedge is lifted by the force of the spring $R^5$, attached near the end of the lever $R^1$. The rocking of this lever $R^1$ has to perform another duty additional to that of simply working the wedge $R^3$, and it is important that this spring $R^5$ shall have considerable force.

The die $r$ is operated mainly by a stout wedging-slide, but it is subject to the force of a gentle spring, $r^4$, tending, unlike the spring $R^4$ on the other die, to hold die $r$ constantly closed against its mate.

The cam $B^7$ imparts the closing motion through the medium of a stout slide, $r^1$, which has an oblique or wedge-like surface at the point $r^2$, acting against a corresponding surface on the transverse slide $r^3$ housed in the framing A. This slide $r^3$ acts against the die $r$, and is adjustable by means of a screw. By turning the screw in or out, the die $r$ can be made to close with greater or less tightness against its mate R.

A spring, $r^4$, having its abutment on the frame A, acts on a pin projecting forward from the die $r$. When the wire M is being simply thrust forward in the grooves between the dies R $r$, these latter are pressed together by the gentle force of the spring $r^4$.

A spring (not represented) presses the slide $r^1$ into contact with the cam $B^7$. This spring should have considerable force in order to accomplish the other duty which is imposed upon it, of moving the die $r$ away from its mate, or opening it. A pin, $r^5$, on the upper surface of the slide $r^1$ acts on the short arm of a lever, $r^6$, which is pivoted on the framing A at the point $r^7$. Its other or longer arm acts on the die $r$ by means of the same pin against which the spring $r^4$ abuts.

The dies R $r$, are thus independently moved, but act in harmony to produce the desired effect on the wire M. They are opened a little at one period to allow the entrance of the awl. They are held together at another period simply by the force of the spring $r^4$. At another period they are pressed firmly together by the action of the cam $B^7$, the cam $B^6$ having previously fixed the wedge $R^3$ in the right position. After the heading of the wire M is completed, the dies open widely for a little period, the die R being withdrawn at this period by the action of the spring $R^4$, and the die $r$ being withdrawn by the action of the lever $r^6$. During this period the pusher performs its function by entering the space thus provided between the dies.

A cam, $B^5$, operates the header S with the two motions required, being properly formed to give the brief period of rest required just before completing its motion. It operates the header directly by acting on a single stout slide, G. The header is adjustable therein by means of screws.

The pusher T is operated from the lever $R^1$. This is shown plainly in Fig. 14. It requires but a slight thrust for its rapid movement in pushing the headed wire home against no resistance, except its friction in the rubber and the further gentle friction due to the pressure of the steadier Y.

A rocking shaft, L, is mounted in bearings in the framing A, having two adjustable arms, $l^1$ $l^2$. The arm $l^1$ is slotted and receives a pin, which is fixed in the side of the lever $R^1$. The arm $l^2$ is slotted and receives a pin fixed in the side of the pusher T. When under the operation of the cam $B^6$, the wedge $R^3$ is momentarily lifted, allowing the die R to be withdrawn. The movement of the lever $R^1$ turns the shaft L, and darts the pusher forward. The same movement of the lever $R^1$ which forces down the wedge $R^3$ withdraws the pusher, and holds its again firmly back with its face in line with the face of the piece P.

I can by a somewhat different arrangement of the other parts use a device substantially like my steadier Y, on the other side of the backing $m$, and make it available to steady the wire by contact with the wire on that side while it is being pushed in.

I claim as my improvements in machines for setting wire teeth for brushes and analogous purposes—

1. The awl U arranged to perforate the material $m$, from one side, in combination with a feeder and connected devices, adapted to feed the wire in from the opposite side during the return of the awl, as herein specified.

2. The deflector X, steadier Y, and awl U, combined and arranged to serve relatively to the backing material $m$, teeth M $M^1$, header S, and means for forcing the latter into place, as herein specified.

3. The grooved dies R $r$, and spring $r^4$, combined as shown.

4. The header S, and carrier, operated with a waiting motion, in combination with dies correspondingly operated to cause the wire M to be first pushed endwise by the header, and afterward tightly griped and headed.

5. The header S and header-carrier $S^1$, mounted on the laterally-moving carriage E, as and for the purposes specified.

6. The header and header-carrier, mounted on the carriage E, as shown, in combination with the operating cam $B^5$, and with the dies R $r$, and pusher T, as herein specified.

7. The steadier Y, having opening and closing parts serving as holders for the wire, grooved on the inner faces, and operated as shown, in combination with mechanism for for feeding the material $m$, and for introducing and feeding forward the lengths of wire M, as herein set forth.

8. The cams $h^3$ $h^4$, stepped as shown, in combination with the traversing-frame I, adapted to determine the varying widths of the brush, as herein specified.

9. The wedge $R^3$, and its operating means in combination with the die R, spring $R^4$, and the sister die $r$, as herein specified.

10. The matched dies R r, serving as guides for the lengths of wire M, in combination with the awl U, and pusher T, as and for the purposes herein specified.

11. The matched dies R r, performing the double functions of guides and dies, in combination with the awl U, header S, and feeding mechanism G', as herein specified.

Witness my hand this 1st day of October, A. D. 1875.

ROBERT ASHWORTH.

In presence of—
   P. E. TESCHEMACHER,
   ARTHUR POLAND.